(12) United States Patent
Szeto (10) Patent No.: US 7,454,472 B2
(45) Date of Patent: Nov. 18, 2008

(54) DETERMINING A MANNER IN WHICH USER INTERFACE COMMANDS ARE PROCESSED IN AN INSTANT MESSAGING ENVIRONMENT

(75) Inventor: Christopher Tzann-En Szeto, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 0 days.

(21) Appl. No.: 11/517,208

(22) Filed: Sep. 6, 2006

(65) Prior Publication Data

US 2007/0005719 A1  Jan. 4, 2007

Related U.S. Application Data

(62) Division of application No. 09/930,878, filed on Aug. 15, 2001, now Pat. No. 7,133,900.

(60) Provisional application No. 60/331,331, filed on Jul. 6, 2001.

(51) Int. Cl.
  *G06F 15/16* (2006.01)

(52) U.S. Cl. ............... 709/206; 709/203; 709/204; 709/227; 709/228; 715/751; 715/758

(58) Field of Classification Search ......... 709/201–206, 709/223–224, 227–228, 250; 715/751–753, 715/758
See application file for complete search history.

(56) References Cited

U.S. PATENT DOCUMENTS

| 4,819,191 | A | 4/1989 | Scully et al. |
| 5,767,848 | A | 6/1998 | Matsuzaki et al. |
| 5,822,123 | A | 10/1998 | Davis et al. |
| 5,877,759 | A | 3/1999 | Bauer |
| 6,380,959 | B1 | 4/2002 | Wang et al. |
| 6,614,450 | B1 | 9/2003 | Vossler |
| 6,677,976 | B2 * | 1/2004 | Parker et al. ............... 709/204 |
| 6,760,580 | B2 * | 7/2004 | Robinson et al. ............ 709/204 |
| 7,257,618 | B2 * | 8/2007 | Danker et al. ............... 709/206 |
| 2003/0046296 | A1 | 3/2003 | Doss et al. |
| 2003/0117427 | A1 | 6/2003 | Haughawout et al. |
| 2004/0117443 | A1 | 6/2004 | Barsness |
| 2005/0039134 | A1 | 2/2005 | Wiggeshoff et al. |
| 2005/0055648 | A1 | 3/2005 | Dong |
| 2005/0160367 | A1 | 7/2005 | Sirota et al. |
| 2006/0236269 | A1 | 10/2006 | Borna |

OTHER PUBLICATIONS

Nelson, et al., "Mirosoft Outlook 98 At A Glance", Microsoft Press, 1997, pp. 98-115, and 118-126.

* cited by examiner

*Primary Examiner*—Bharat N Barot
(74) *Attorney, Agent, or Firm*—Hickman Palermo Truong & Becker LLP (57) ABSTRACT

Sharing an instant messaging environment is described. The instant messaging environment is selected from a set of stored instant messaging environments. An instant messaging environment identifier corresponding to the selected instant messaging environment is transmitted from a transmitting instant messaging application to a receiving instant messenger application. The instant messaging environment identifier is received and the stored instant messaging environment corresponding to the instant messaging environment identifier is retrieved. The instant messaging environment is activated in the receiving instant messaging application.

36 Claims, 7 Drawing Sheets

DETERMINING A MANNER IN WHICH USER INTERFACE COMMANDS ARE PROCESSED IN AN INSTANT MESSAGING ENVIRONMENT

RELATED APPLICATIONS

This application is a divisional and claims priority to U.S. patent application Ser. No. 09/930,878 entitled "Sharing and Implementing Instant Messaging Environments", filed Aug. 15, 2001 now U.S. Pat. No. 7,133,900 which is incorporated herein by reference for all purposes, and which claims Benefit of priority to U.S. Provisional Application No. 60/331,331 filed Jul. 6, 2001.

FIELD OF THE INVENTION

The present invention relates generally to a message exchange system. More specifically, messaging environments that affect how a messaging application presents messages and interacts with a user are disclosed.

BACKGROUND OF THE INVENTION

Instant messaging has become one of the most popular applications on the Internet. Instant messaging programs generally allow users to send and receive messages. The messages are generated and displayed by an instant messaging client on each end and an instant messaging server may perform various functions to facilitate the transfer of messages.

Figure 1:
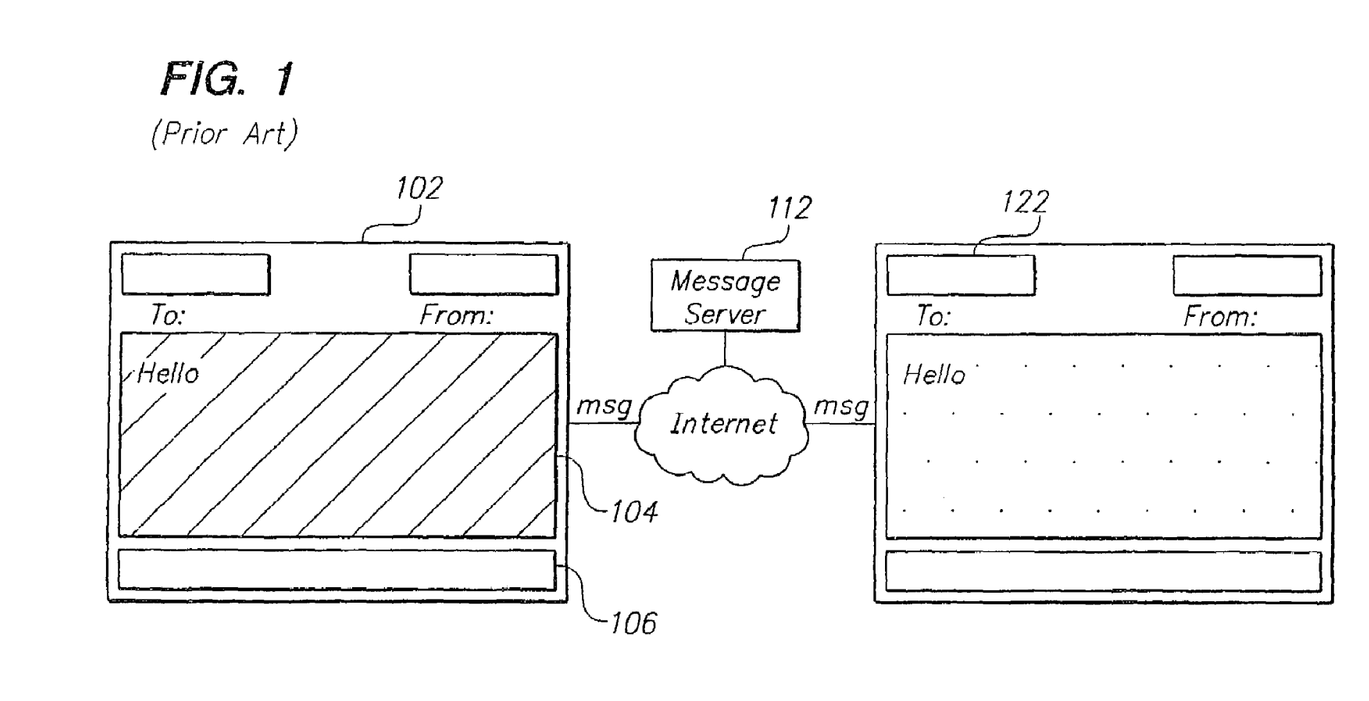
FIG. 1 is a diagram illustrating an instant messaging system operating over the Internet.

FIG. 1 is a diagram illustrating an instant messaging system operating over the Internet. An instant messaging client creates an instant messaging window 102 on a computer that generally includes a history window 104 containing messages that have been exchanged in the past, and a new text window 106 for new messages. In addition, the instant messaging client may display various menus and buttons that activate common instant messaging functions such as changing font, ringing another user, inserting symbols, etc. The instant messaging window also generally includes a space where the sender and the recipient of the message are identified.

A message server 112 is also connected to the Internet. In various instant messaging systems, the message server may perform different functions such as receiving messages and transferring them, replacing certain text with symbols, or otherwise modifying or relaying messages. A second instant messenger client also creates an instant messaging window 122 that also includes a history window and a new text window. Instant messaging window 122 displays a message sent from instant messaging window 102 via message server 112. It should be noted that the client software that runs on the instant messenger clients and the server software that runs on the instant messenger server may be referred to collectively or separately herein as an instant messenger application.

Each instant messenger client provides for various user interface commands that allow a user to interact with the instant messenger window in various ways, and, to some extent, configure the window to the user's taste. For example, the user may select a color for the history window from among various colors available to the user. In this manner, the user configures his instant messenger window to have a desired appearance. In addition, a user may turn certain features such as ringing, on or off.

The instant messaging client may also be configured to react to certain content received as a message by running a routine or performing some function. For example, when a ring is received, the instant messaging client may be configured to react to the ring by playing a sound, shaking, or executing some other action. The instant messaging application may also be configured not to respond to such a ring. Also, the instant messaging application may be configured to insert an image or play a sound when certain text is included in a message. Thus, a user is generally able to exercise a certain amount of control over the appearance and operation of his own instant messaging application. However, users are generally unable to affect the environment or state of another user's instant messaging client or window.

Thus, users are able to send messages and configure their own instant messaging applications to perform certain actions based on message content. However, users are generally unable to configure other user's instant messaging windows to react to messages and provide other useful functions or displays based on a selected messaging environment. It would be useful if a reliable, secure system and method could be provided for instant messaging users to create or select instant messaging environments and share those environments among themselves.

SUMMARY OF THE INVENTION

A system and method for storing, configuring, selecting and using instant messaging environments in an instant messaging conversation is disclosed. An instant messaging environment may affect the behavior and appearance of an instant messaging conversation. A sending instant messaging application can specify an instant messaging environment identifier along with a message and cause a receiving instant messaging application to implement the environment corresponding to the environment identifier. The selected instant messaging environment may affect the state of the instant messaging application in a number of ways. The environment may affect how user interface commands are processed by the instant messaging application as well as the appearance of the instant messaging window and the manner in which information is sent and processed by the instant messaging application. In some embodiments, an instant messaging application may be configured to accept specified environments from certain users and not from others. Instant messaging environments may be downloaded from one or more central instant messaging servers so that users may obtain new environments to specify to other users. When the instant messaging application receives an environment identifier for which the instant messaging application does not have the corresponding environment, that instant messaging application may also download the environment from the central instant messaging server.

It should be appreciated that the present invention can be implemented in numerous ways, including as a process, an apparatus, a system, a device, a method, or a computer readable medium such as a computer readable storage medium or a computer network wherein program instructions are sent over optical or electronic communication links. Several inventive embodiments of the present invention are described below.

In one embodiment, sharing an instant messaging environment includes selecting the instant messaging environment from a set of stored instant messaging environments; transmitting an instant messaging environment identifier corresponding to the selected instant messaging environment from a transmitting instant messaging application to a receiving instant messenger application; receiving the instant messaging environment identifier; retrieving the stored instant messaging environment corresponding to the instant messaging environment identifier; and activating the instant messaging environment in the receiving instant messaging application.

In one embodiment, processing a user interface command in an instant messaging application includes receiving the user interface command; and processing the user interface command in a manner specified by a predetermined instant messaging environment.

These and other features and advantages of the present invention will be presented in more detail in the following detailed description and the accompanying figures which illustrate by way of example the principles of the invention.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

A detailed description of a preferred embodiment of the invention is provided below. While the invention is described in conjunction with that preferred embodiment, it should be understood that the invention is not limited to any one embodiment. On the contrary, the scope of the invention is limited only by the appended claims and the invention encompasses numerous alternatives, modifications and equivalents. For the purpose of example, numerous specific details are set forth in the following description in order to provide a thorough understanding of the present invention. The present invention may be practiced according to the claims without some or all of these specific details. For the purpose of clarity, technical material that is known in the technical fields related to the invention has not been described in detail so that the present invention is not unnecessarily obscured.

Figure 2:
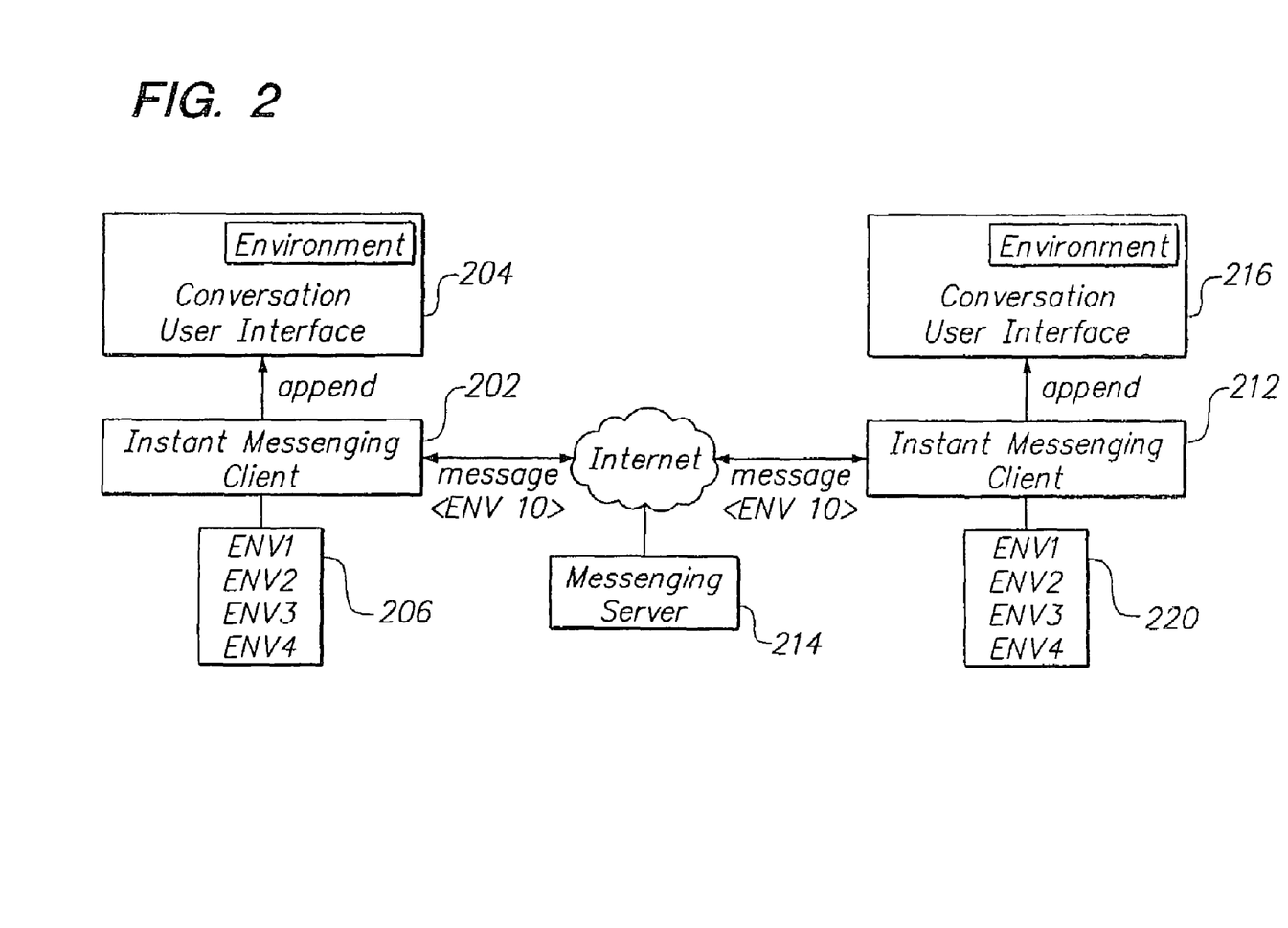
FIG. 2 is a block diagram illustrating an instant messaging system that implements instant messaging environments stored by instant messaging applications.

FIG. 2 is a block diagram illustrating an instant messaging system that implements instant messaging environments stored by instant messaging applications. It should be noted that, while this description refers extensively to instant messaging systems, the disclosed environments are also applied to other messaging systems in different embodiments. In general, an instant messaging system refers to any real time or near real time messaging or information exchange system. Many such systems will buffer messages sent to a participant who is temporarily unavailable or offline. A notification may be sent to the participant. An instant messaging environment may be specified by one instant messaging application to change the environment or state of another instant messaging application. A first instant messaging client, 202 interacts with a conversation user interface 204 that displays information to and receives messages from a user.

It should be noted that the term "application" as used herein is intended to refer to any client application, server application, distributed application, self contained application or combination thereof. An application may be implemented in any appropriate manner, including being embedded in a chip or being loaded into memory or firmware.

In some embodiments, the conversation user interface includes a conventional instant messaging window as shown in FIG. 1 with a history window for displaying previous messages and a new message window for composing new messages. In other embodiments, the conversation user interface may be dramatically different. For example, in one embodiment, the conversation user interface of the history window is modified to resemble a cartoon interface that shows the participants in instant messaging as comic characters or avatars having a conversation with text bubbles used to list messages back and forth. The conversation user interface may also include multiple history windows and other menus associated with instant messaging features such as buddy lists, formatting options, etc. Instant messaging environments as described herein may generally be applied to any type of conversation user interface used to display and author messages.

User interface commands are transferred from the instant messenger client to the conversation user interface to cause the conversation user interface to display instant messages and their corresponding environment to the user. For example, an append command is used to send a new message received from another instant messaging application to the conversation user interface. The append command may simply cause the received message to be added to a history window if a generic environment is selected. It should be noted that the phrase "user interface commands" as used herein is intended to encompass any functions, behaviors, actions, capabilities, etc. that are features of the user interface or the instant messaging window.

Other instant messaging environments may cause the append command to behave in different manners. For example, in the cartoon instant messaging environment, the append command would cause the last text bubble generated for the character corresponding to the message sender to disappear and for a new text bubble containing the current message to be created. Thus, the selected environment affects the state of the instant messaging application so that a user interface command specified by the instant messaging client may have different effects depending on the selected environment. A number of different environments may be stored in a cache 206.

In discussing the example shown, for the purpose of explanation, instant messaging client 202 will be described as sending a message to instant messaging client 212. In general, the two instant messaging clients will both send and receive messages in turn. Instant messaging client 202 sends a message that includes an environment identifier along with the message over the Internet. Throughout this specification, the Internet is referred to as a medium over which messages are sent. The disclosed system also operates over any other appropriate network or internetwork including wireless networks, proprietary networks, intranets, local area networks, or wide area networks. In one embodiment, instant messaging server 214 receives a message, processes the message and transfers the message to instant messaging client 212. In other embodiments, a peer to peer messaging system is implemented in which an instant messaging server need not necessarily become involved in transferring messages between instant messaging clients.

If a messaging server does process messages, then the messaging server may perform certain checks to determine whether the environment identifier as specified along with the message corresponds to a valid environment. In some embodiments, environments may expire as a result of a sponsorship or other type of agreement to maintain the environment lapsing.

The message along with the environment identifier is received by instant messaging client 212. Instant messaging client 212 also stores in a cache 220 various environments that it has obtained in the past. Instant messaging client 212 searches the cache for an environment that corresponds to the environment identifier received from instant messaging client 202. If a corresponding environment is found, then instant messaging client 212 changes the environment currently implemented by it.

The current environment affects how user interface commands sent from instant messaging client 212 to conversation user interface 216 are processed. In one embodiment, the instant messaging client may check whether or not an environment has expired before it implements that environment. If an environment has expired, then the instant messaging client may retrieve an updated environment from the instant messaging server or another specified source via the network.

Figure 3:
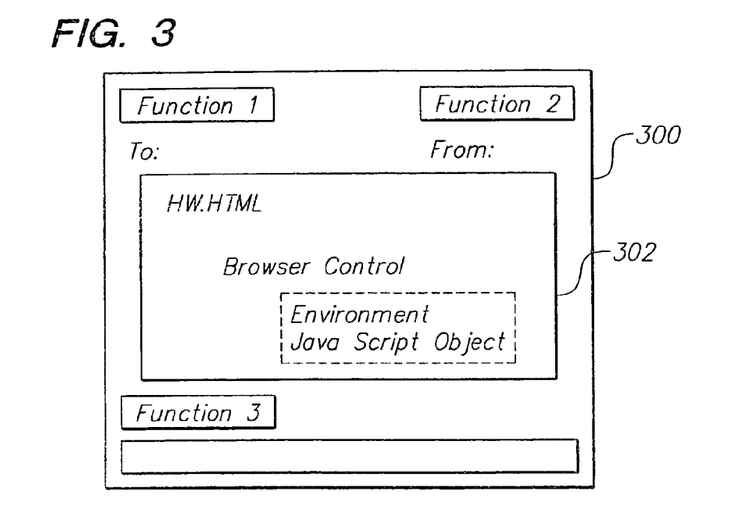
FIG. 3 is a diagram illustrating how an instant messaging environment is implemented using a browser control window.

FIG. 3 is a diagram illustrating how an instant messaging environment is implemented using a browser control window. It should be noted that a browser control window as used herein is intended to refer to any program control or set of controls that can interpret and render scripted pages. Also, any other appropriate system for rendering information may be used. Instant messaging window 300 is configured in a similar manner as a conventional instant messaging window with a TO field, a FROM field, and various function and menu buttons surrounding a history window 302. However, history window 302 is implemented in an unconventional manner. History window 302 is implemented using code in a browser control that processes an HTML file which contains the formatting for the history window and controls the appearance of the instant messaging cache that appears therein.

In one embodiment, the instant messaging environment is implemented by loading into memory one or more JavaScript objects that implement methods and behaviors that override the history window's default methods and behaviors. Of course, objects may be written in any appropriate programming language or system, such as ActiveX. In another embodiment, an Iframe that is not visible to the user includes JavaScript that implements the instant messaging environment. For example, if a message is received by the instant messaging client and an append function is called to add that message to the history window, then the environment embedded in the JavaScript code alters the way the browser control processes the append function. For example, the JavaScript may include a different version of the append function that causes text to be appended in a different manner than it would normally be appended if no environment were implemented by the code in the browser control. It should be noted that loading a JavaScript object without using an Iframe is generally preferred over the Iframe implementation for the sake of speed. This description refers to both implementations and it should be noted that when one implementation is referenced, that the other implementation (or any reasonable alternative implementation) may be used in different embodiments.

Once the code in the browser control has executed the modified append function contained in the environment, the environment may either allow the normal append function to be subsequently executed or may indicate that the normal append function should not be executed, essentially replacing the normal append function with the modified version. For example, an environment may cause a sound or visual effect to occur every time a new line is appended to the history window. In such a case, the environment would cause the browser control upon receiving the append function to first execute some JavaScript that would play the sound or create the visual effect and then return to the normal append function for the text to be appended in a conventional manner. In another example, such as the one described above where the history window includes cartoon characters and text bubbles that contain the appended text, the normal append function would be replaced by the append function contained in the environment and the normal append function would not be called upon completion of the executed environment code.

Thus, implementing code in a browser control within an instant messaging window that renders an HTML allows user interface commands to be redefined. Different environments are stored simply as different sets of code. The JavaScript contained in the environment redefines certain commands or functions by executing additional commands and then either calling or not calling the original function as desired.

It is important to note that, while the above described JavaScript code implementation of instant messaging environments has significant advantages, it is by no means the only manner in which instant messaging environments are implemented. In different embodiments, instant messaging environments are implemented by using different code structures. In general, a certain set of code representing the environment is accessed by the instant messaging application. The set of code is loaded in response to the specification of an instant messaging environment identifier by another instant messaging application. The environment may also be specified by the user of the application. By way of example and without limitation, instant messaging environments may be implemented using the wireless application protocol, XML, VRML, or any other appropriate public or private standard.

The specified environment alters the response of the instant messaging application to actions performed by the user. As shown in FIG. 2, in one embodiment, this alteration occurs by redefining commands or functions sent from the instant messaging client to the conversation user interface. As explained further in FIG. 3, in one embodiment, this may be implemented by using a browser control to render a history window and loading a JavaScript object that includes the function definitions. It should be apparent that many alternatives exist for implementing this system in a similar manner.

As a further example, another function that may be redefined is the scroll function. The user may indicate by dragging the mouse over an arrow button in the instant messaging window or by some other convenient means that he would like to scroll the history window. When such a scroll command is received, then a check is first made to determine whether or not the scroll command has been redefined by a loaded environment. For example, an environment may contain a watermark that is intended to always show up in the history window. In such a case, the scroll function would be redefined so that the watermark does not scroll within the window while the rest of the text inside the window does scroll.

As shown in FIG. 2, environment identifiers are passed between instant messaging applications by including an environment identifier along with each message. In one embodiment, there is a default environment identifier that is automatically passed between instant messaging applications if no environment has been specified by either of the users. Once one of the users specifies an environment, if the other user accepts the environment then that user will then pass the accepted environment identifier back to the user that originally specified the environment identifier, thus maintaining the environment. Environments may be selected by users in a variety of ways. For example, audio or video user inputs may be processed or used to select or modify an environment. Also, a robot or other program communicating with a user may select or modify an environment. Other context information about the user's system, a specified default environment or set of environments, or message content may select or modify an environment. One environment may select or modify another environment and a central instant messaging server may itself specify or modify an environment.

If an instant messaging application passes an environment identifier that is not accepted by the receiving instant messaging application, then the receiving instant messaging application will send back the default environment identifier and the sending instant messaging application may either change back to the default environment or maintain its own environment according to how it is configured. Thus, the instant messaging environment is either maintained or changed with each message passed back and forth containing an environment identifier.

Figure 4:
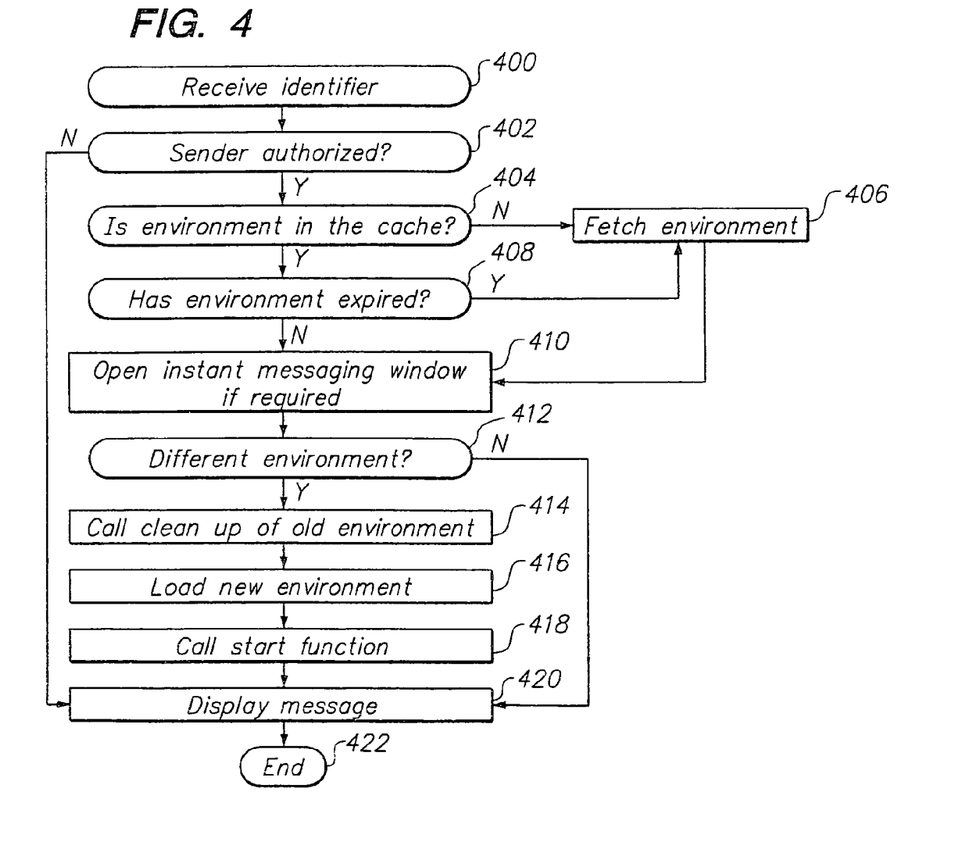
FIG. 4 is a flow chart illustrating a process executed by an instant messaging application when an environment identifier is received.

FIG. 4 is a flow chart illustrating a process executed by an instant messaging application when an environment identifier is received. The environment identifier is received in step 400. Next, in step 402, it is determined whether the sender of the identifier is an authorized sender. In one embodiment, this is determined by whether the sender is a member of a buddy list or other list maintained by the receiver of parties eligible to send environment identifiers and change the environment of the recipient's instant messaging application. If the sender is not authorized, then control is transferred to step 420 and the message is displayed.

If the sender is authorized, then control is transferred to step 404 and it is determined whether the environment is already cached by the receiving instant messaging application. If the environment is not cached by the receiving instant messaging application, then control is transferred to a step 406 where the environment is fetched. In one embodiment, the environment is loaded by accessing a website that makes environments available for download. The environment identifier may be sent to the website to identify the environment to be downloaded. In other embodiments, the environment may be obtained from the sender and an authentication code or signature may be used to verify the integrity of the environment. Once the environment is downloaded, then control is transferred to step 410. If the environment is in the cache, then control is transferred from step 404 to step 408 and it is determined whether the environment has expired.

In one embodiment, environments that are not found in a local cache are obtained from a secure source, such as a trusted website. This secure mode of distribution prevents parties from using environments for hostile purposes. Since instant messaging participants merely refer to environments and the referred to environments are separately obtained from a trusted source, participants do not intentionally or inadvertently send damaging environments to each other.

In one embodiment, whenever an environment is downloaded by an instant messaging application, an expiration date is also provided to the instant messaging application so that the instant messaging application can determine if the environment has expired. In another embodiment, the instant messaging application is required to always check with an instant messaging server to determine whether an environment has expired before that environment is implemented.

If the environment has expired, then control is transferred to step 406 and the environment is loaded. If the environment has not expired, then control is transferred to step 410 and an instant messaging window is opened if an instant messaging window is currently not open. Control is then transferred to step 412 where it is determined whether a different environment has been specified by the received environment identifier. If a different environment has not been specified, then the currently loaded environment may continue to be used and control is transferred to step 420 where the message is displayed.

If the environment is different, then control is transferred to step 414 and a clean up function is called for the old environment. Control is then transferred to step 416 and the new environment is loaded into memory. Next, in step 418, the start function is called for the new environment so that any code that should be executed when the new environment is loaded is executed. Control is then transferred to step 420 and the message is displayed. The process ends at 422.

In one embodiment, an environment is downloaded from a website by receiving a series of different types of files. The first type of file is an initialization file that contains information regarding the environment that the instant messenger application can access without actually loading the environment. The initialization file may contain items such as a display name that determines how the environment will be listed in a formatting tool bar used to select environments and an expiration that can be used by the instant messaging application to determine that the environment is invalid and initiate a download of an updated version of the environment.

The second type of file is the actual environment program file that contains, in one embodiment, encoded JavaScript that defines how the environment looks and behaves. The third type of file generally downloaded is media file such as an image file, video clip, animation, sound clip, etc. that provides images or other media that are generally used by the environment. In different embodiments, the different types of files are encrypted or compressed either together or separately and encapsulated or signed as is deemed appropriate. The files may be sent together using the zip or the .cab or other archive or compression format, if desired. Preferably, at least the JavaScript objects are encrypted.

Figure 5:
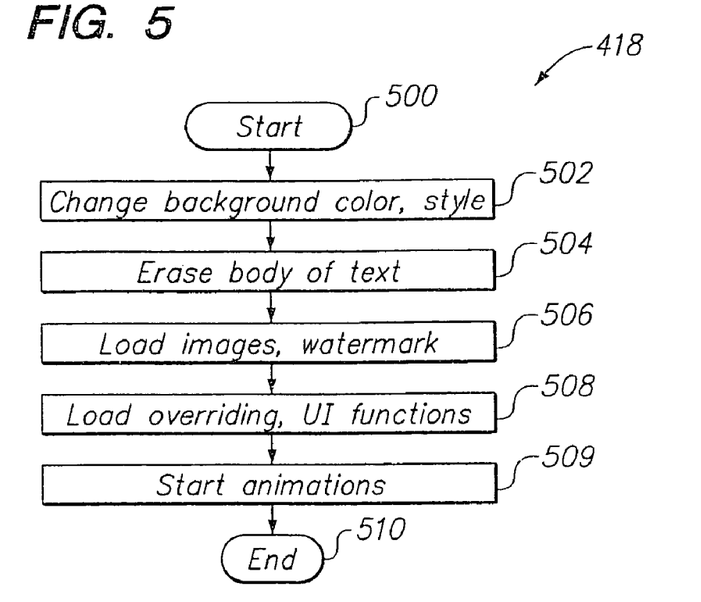
FIG. 5 is a flow chart illustrating in further detail a process that is executed when the start function is called in step 418 of FIG. 4.

FIG. 5 is a flow chart illustrating in further detail a process that is executed when the start function is called in step 418 of FIG. 4. The process begins at 500. In step 502, the background, color and style of the instant messaging window is changed to the background, color and style of the environment that has been selected. In step 504, the body of text is erased. It should be noted that in some environments, the body of text may not be erased but in other environments the body of text may need to be erased. For example, in the cartoon environment shown above, only the current message being conveyed is shown in a text bubble. Next, in step 506, any images and watermarks associated with the environment are loaded. Then, in step 508, any overriding user interface functions are loaded so that when a user interface command is received, the function called by the command may be changed to the function specified by the instant messaging environment. In step 509, any animations (such as falling snowflakes as shown below) associated with the environment are started. The process ends at 510.

Figure 6:
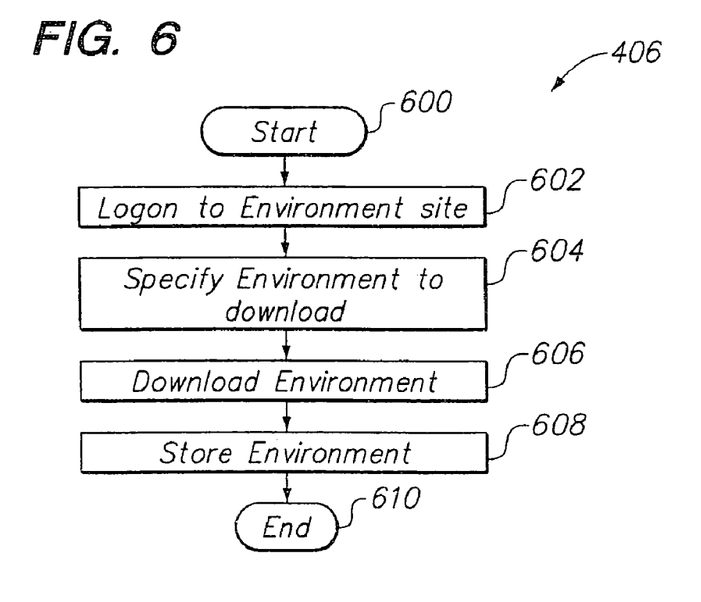
FIG. 6 is a flow chart illustrating a process implemented to load an environment as shown in step 406 of FIG. 4.

FIG. 6 is a flow chart illustrating a process implemented to load an environment as shown in step 406 of FIG. 4. The process starts at 600. In a step 602, the application logs on to a website that includes environments available for download. In step 604, the application specifies an environment to be downloaded. In one embodiment, the same environment identifier used by applications to identify environments to each other is used to identify an environment to download. In a step 606, the environment is downloaded. The environment is stored in step 608. The process ends at 610.

Requiring that the instant messaging environment be downloaded from one or more central sites enables editorial control to be exercised over the environments that are sent to users. Obscene environments or other undesirable environments can be avoided. Also, viruses and other malicious code can be excluded. In certain embodiments, users may be allowed to create environments and send them to other users, but it is an important feature that in some embodiments, there is at least one mode where environments are only downloaded from a trusted or controlled source that ensures security and, if desired, some control over content. One important use of instant messaging environments is advertising. When an instant messaging environment includes an ad, controlling the source of the environment facilitates tracking of the environment use as well as making sure that the environment is not altered.

It should be noted that when the environment is downloaded, data in the initialization file for the environment may be separately stored in a table or system registry so that information about loaded environments may be readily accessed by the instant messaging application without opening files. For example, if an expiration date is associated with the environment, then that date may be written into an expiration table so that the instant messaging application can periodically perform clean up and delete expired environments or check before an environment is accessed whether or not it has expired. Likewise, the names of various download environments may be stored in a single table used to create a list of environments for a menu that facilitates the selection of environments by a user.

Figure 7:
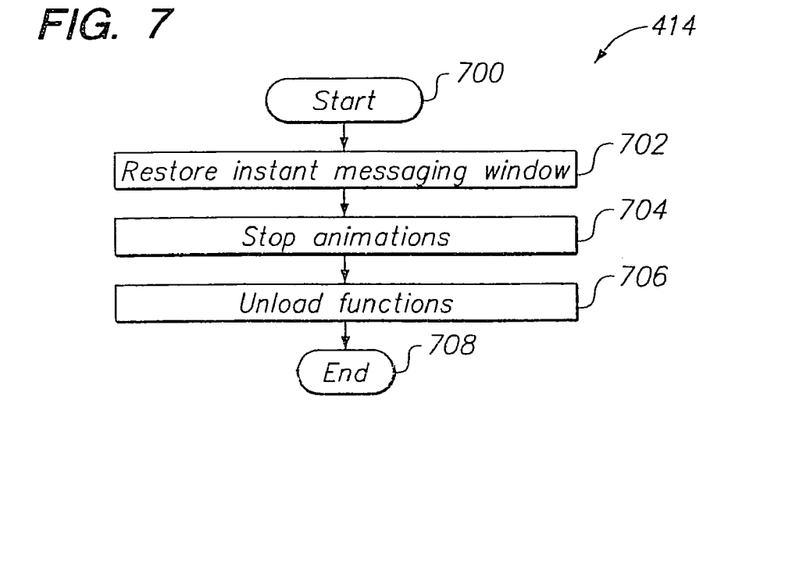
FIG. 7 is a flow chart illustrating a process implemented to clean up an old environment.

FIG. 7 is a flow chart illustrating a process implemented to clean up an old environment. The process starts at 700. In a step 702, the instant messaging window is restored to a default state. That may involve, for example deleting a watermark created by the old environment. The default state may include a default background color, font, style, etc. In step 704, any animations or other routines are stopped. In a step 706 redefined functions that replace user interface commands are unloaded. The process then ends at 708. It should be noted that other clean up operations may typically be included in a clean up process.

Figure 8:
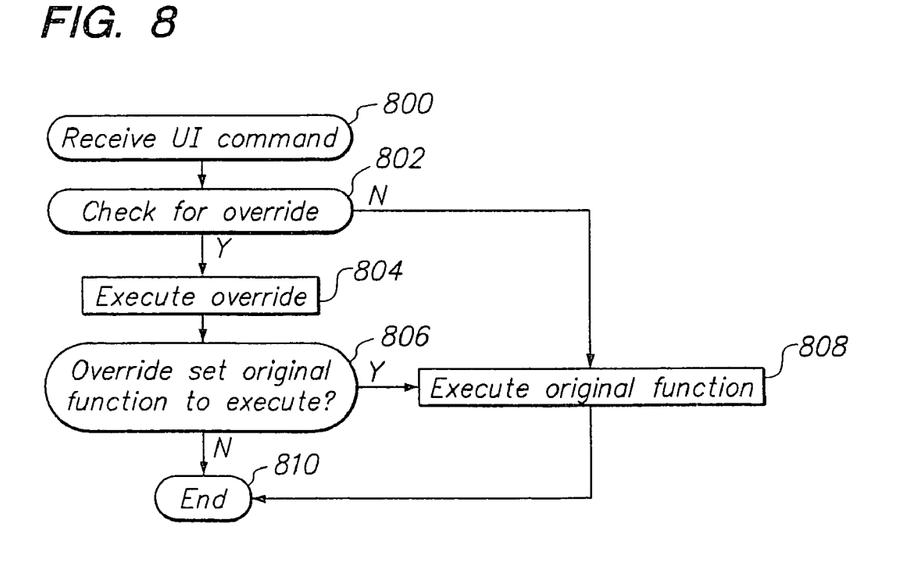
FIG. 8 is a flow chart illustrating a process executed by the instant messaging application in response to a user interface command.

FIG. 8 is a flow chart illustrating a process executed by the instant messaging application in response to a user interface command. The process starts at 800 when the user interface command is received. In step 802, it is determined whether an overriding or modified function has been defined by the currently loaded environment. If no overriding function is defined, then control is transferred to a step 808 and the original function is executed. If an overriding or modified function does exist, then control is transferred to step 804 and the overriding function is executed. Control is then transferred to a step 806 where it is determined whether the overriding function has set the original function to execute once it has been completed. If the original function is to execute, then control is transferred to step 808 and the original function is executed. If the original function is not to be executed, then control is transferred to step 810 and the process ends.

Sending environment identifiers between instant messaging applications and using the environment identifiers to change the environment of a receiving application has been described. Once this capability of redefining user interface command functions, executing animations and creating event driven actions to occur in an instant messaging window has been enabled, a rich variety of environments can be defined for instant messaging applications. Some examples of instant messaging environments that may be created are provided in FIGS. 9A through 9C.

Figure 9A:
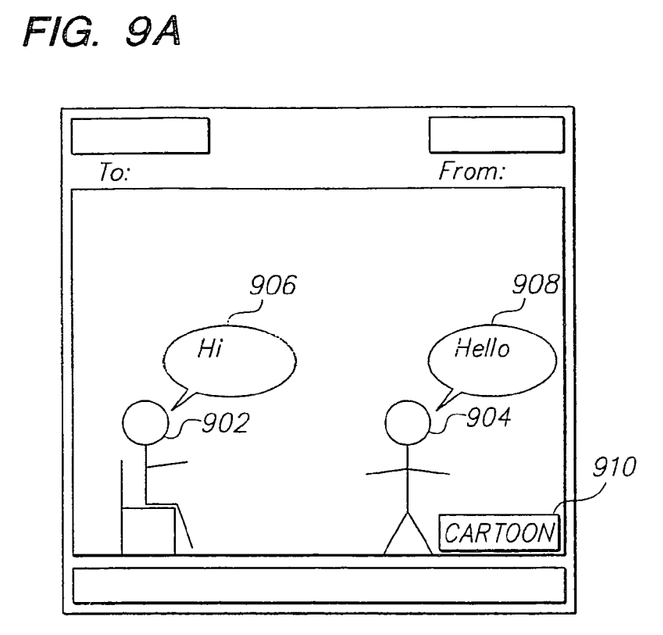
FIG. 9A is a diagram illustrating a cartoon instant messaging environment such as the one described above.

FIG. 9A is a diagram illustrating a cartoon instant messaging environment such as the one described above. Characters 902 and 904 represent participants in the instant messaging session and text bubbles 906 and 908 display the last message sent by each of the participants. This environment is implemented by redefining the append function to delete an existing text bubble above the character representing the sender of the text message and then insert the message being sent into a new text bubble. In addition, the start function of the environment deletes all text in the history window and draws in the characters that are part of the cartoon. In addition, a watermark 910 is provided that shows the name of the cartoon that is the theme of the environment. In many embodiments, the watermark also functions as a link so that a user may link to a website related to the environment. This technique is especially useful when the environment is part of an ad campaign.

The instant messaging server may track statistics about environments for various reasons. For example, if an environment has an advertisement theme associated with it, then each time the environment is specified by a user to another user that event may be counted by the server so that ad revenue can be generated. In addition, when certain functions within the environment are called as a result of events, the instant messaging server may record such occurrences as well and those events may also generate ad revenue.

Figure 9B:
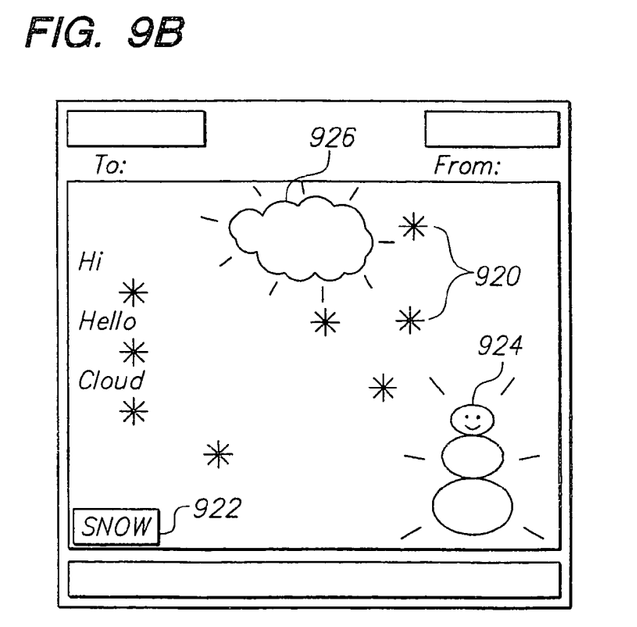
FIG. 9B is a diagram illustrating an environment where a snow theme has been implemented.

FIG. 9B is a diagram illustrating an environment where a snow theme has been implemented. Animated snowflakes 920 fall down the window so long as the environment is active. In addition, a watermark 922 is present that provides a link to a site related to snow. Also, when the ring or buzzer function is called by one of the users, then instead of the general ringing, a snowman 924 appears and flashes. Also, when certain text is typed in the window such as the word cloud, a cloud 926 appears.

Figure 9C:
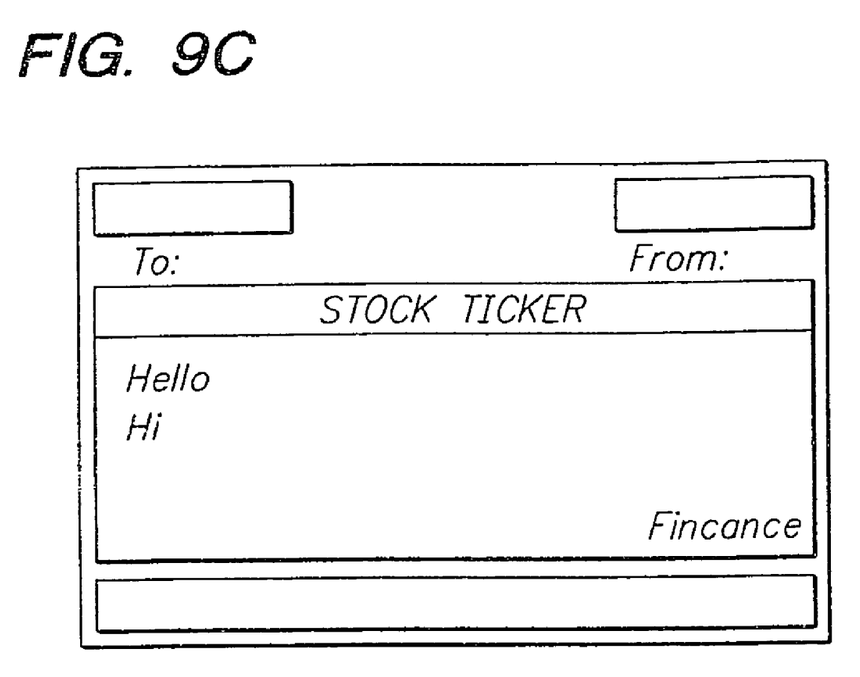
FIG. 9C is a diagram illustrating another environment where the ability of an environment to interact with another application is illustrated.

FIG. 9C is a diagram illustrating another environment where the ability of an environment to interact with another application is illustrated. In the environment shown, a stock ticker obtains information from either the instant messaging program, a browser, or other program that makes stock information available to user. In addition, the environment includes a finance watermark link that directs the user to a financial site. In this environment, when the environment is loaded, a function is periodically executed that checks for data from the stock ticker application. In addition, environments can communicate information to other environments by sending messages. Also, environments can read certain information available to a messenger program such as a buddy list or in some cases stock quote information.

Procedures for distributing and implementing instant messaging environments have been described. A number of exemplary environments that may be created using these procedures and techniques have also been shown. In addition to being used in instant messaging environments between two users, the techniques described herein may also apply to instant messaging environments that include one, three, or more users.

Although the foregoing invention has been described in some detail for purposes of clarity of understanding, it will be apparent that certain changes and modifications may be practiced within the scope of the appended claims. It should be noted that there are many alternative ways of implementing both the process and apparatus of the present invention. Accordingly, the present embodiments are to be considered as illustrative and not restrictive, and the invention is not to be limited to the details given herein, but may be modified within the scope and equivalents of the appended claims.

What is claimed is:

1. A method of processing user interface commands in an instant messaging application, comprising:
   receiving, at the instant messaging application, a user interface command;
   receiving, at the instant messaging application, data that indicates that the user interface command is associated with a particular manner of processing the user interface command, wherein the particular manner of processing the user interface command comprises a particular manner of appending text to a history window;
   determining that an instant messaging environment that is currently active in the instant messaging application specifies a currently-active manner of processing the user interface command; and
   over-riding the currently-active manner of processing the user interface command with the particular manner of processing the user interface command by processing the user interface command in the particular manner;
   wherein the particular manner of processing the user interface command and the currently-active manner of processing the user interface command are different,
   wherein processing the user interface command in the currently-active manner comprises appending text to the history window differently than appending text to the history window in the particular manner.

2. The method of claim 1, wherein over-riding the currently-active manner of processing the user interface command comprises re-defining a function performed by the user interface command.

3. The method of claim 1, wherein over-riding the currently-active manner of processing the user interface command comprises re-defining an action taken in response to executing the user interface command.

4. The method of claim 1, wherein over-riding the currently-active manner of processing the user interface command comprises re-defining a behavior associated with the user interface command.

5. The method of claim 1, wherein over-riding the currently-active manner of processing the user interface command comprises extending a capability of the user interface command.

6. The method of claim 1, wherein processing the user interface command in the particular manner comprises executing an instruction specified by the instant messaging environment and then executing the user interface command.

7. The method of claim 1, wherein the user interface command is received in a conversation user window of the instant messaging application.

8. A method of processing user interface commands in an instant messaging application, comprising:
   receiving, at the instant messaging application, a user interface command;
   receiving, at the instant messaging application, data that indicates that the user interface command is associated with a particular manner of processing the user interface command;
   determining that an instant messaging environment that is currently active in the instant messaging application specifies a currently-active manner of processing the user interface command; and
   over-riding the currently-active manner of processing the user interface command with the particular manner of processing the user interface command by processing the user interface command in the particular manner,
   wherein the particular manner of processing the user interface command and the currently-active manner of processing the user interface command are different,
   wherein processing the user interface command in the particular manner comprises processing the user interface command in a hidden frame of a browser window.

9. A method of processing user interface commands in an instant messaging application, said method comprising:
   receiving a user interface command in the instant messaging application; determining which of a plurality of instant messaging environments is currently active in the instant messaging application;
   if a first instant messaging environment is currently active in the instant messaging application, processing the user interface command in a first manner, wherein processing the user interface command in the first manner comprises appending text to a history window in the first manner; and
   if a second instant messaging environment is currently active in the instant messaging application, processing the user interface command in a second manner, wherein processing the user interface command in the second manner comprises appending text to the history window differently than appending text to the history window in the first manner;
   wherein the first manner is different from the second manner.

10. The method of claim 9, wherein the first instant messaging environment is a generic instant messaging environment.

11. The method of claim 10, wherein the second instant messaging environment is an instant messaging environment other than the generic instant messaging environment.

12. The method of claim 9, wherein:
   processing the user interface command in the first manner comprises performing a first function in a user interface of the instant messaging application; and
   processing the user interface command in the second manner comprises performing a second function in the user interface of the instant messaging application;
   wherein the first function is different from the second function.

13. The method of claim 9, wherein:
   processing the user interface command in the first manner comprises performing a first action in a user interface of the instant messaging application; and
   processing the user interface command in the second manner comprises performing a second action in the user interface of the instant messaging application;
   wherein the first action is different from the second action.

14. The method of claim 9, wherein:
   processing the user interface command in the first manner comprises causing a first behavior to occur in a user interface of the instant messaging application; and processing the user interface command in the second manner comprises causing a second behavior to occur in the user interface of the instant messaging application;
wherein the first behavior is different from the second behavior.

15. The method of claim 9, wherein:
processing the user interface command in the second manner comprises processing the user interface command in a manner pertaining to a first capability of a user interface of the instant messaging application; and
processing the user interface command in the second manner comprises processing the user interface command in a manner pertaining to a second capability of the user interface of the instant messaging application;
wherein the first capability is different from the second capability.

16. The method of claim 9, wherein processing the user interface command in the second manner comprises executing an instruction specified by the instant messaging environment and then executing the user interface command.

17. The method of claim 9, wherein the user interface command is received in a conversation user window of the instant messaging application.

18. A method of processing user interface commands in an instant messaging application, said method comprising:
receiving a user interface command in the instant messaging application;
determining which of a plurality of instant messaging environments is currently active in the instant messaging application;
if a first instant messaging environment is currently active in the instant messaging application, processing the user interface command in a first manner; and
if a second instant messaging environment is currently active in the instant messaging application, processing the user interface command in a second manner;
wherein the first manner is different from the second manner,
wherein processing the user interface command in the second manner comprises processing the user interface command in a hidden frame of a browser window.

19. A computer-readable storage medium storing instructions for processing user interface commands in an instant messaging application, the instructions, when executed by one or more processors, cause the one or more processors to perform the method of claim 1.

20. A computer-readable storage medium storing instructions for processing user interface commands in an instant messaging application, the instructions, when executed by one or more processors, cause the one or more processors to perform the method of claim 2.

21. A computer-readable storage medium storing instructions for processing user interface commands in an instant messaging application, the instructions, when executed by one or more processors, cause the one or more processors to perform the method of claim 3.

22. A computer-readable storage medium storing instructions for processing user interface commands in an instant messaging application, the instructions, when executed by one or more processors, cause the one or more processors to perform the method of claim 4.

23. A computer-readable storage medium storing instructions for processing user interface commands in an instant messaging application, the instructions, when executed by one or more processors, cause the one or more processors to perform the method of claim 5.

24. A computer-readable storage medium storing instructions for processing user interface commands in an instant messaging application, the instructions, when executed by one or more processors, cause the one or more processors to perform the method of claim 6.

25. A computer-readable storage medium storing instructions for processing user interface commands in an instant messaging application, the instructions, when executed by one or more processors, cause the one or more processors to perform the method of claim 8.

26. A computer-readable storage medium storing instructions for processing user interface commands in an instant messaging application, the instructions, when executed by one or more processors, cause the one or more processors to perform the method of claim 7.

27. A computer-readable storage medium storing instructions for processing user interface commands in an instant messaging application, the instructions, when executed by one or more processors, cause the one or more processors to perform the method of claim 9.

28. A computer-readable storage medium storing instructions for processing user interface commands in an instant messaging application, the instructions, when executed by one or more processors, cause the one or more processors to perform the method of claim 10.

29. A computer-readable storage medium storing instructions for processing user interface commands in an instant messaging application, the instructions, when executed by one or more processors, cause the one or more processors to perform the method of claim 11.

30. A computer-readable storage medium storing instructions for processing user interface commands in an instant messaging application, the instructions, when executed by one or more processors, cause the one or more processors to perform the method of claim 12.

31. A computer-readable storage medium storing instructions for processing user interface commands in an instant messaging application, the instructions, when executed by one or more processors, cause the one or more processors to perform the method of claim 13.

32. A computer-readable storage medium storing instructions for processing user interface commands in an instant messaging application, the instructions, when executed by one or more processors, cause the one or more processors to perform the method of claim 14.

33. A computer-readable storage medium storing instructions for processing user interface commands in an instant messaging application, the instructions, when executed by one or more processors, cause the one or more processors to perform the method of claim 15.

34. A computer-readable storage medium storing instructions for processing user interface commands in an instant messaging application, the instructions, when executed by one or more processors, cause the one or more processors to perform the method of claim 16.

35. A computer-readable storage medium storing instructions for processing user interface commands in an instant messaging application, the instructions, when executed by one or more processors, cause the one or more processors to perform the method of claim 18.

36. A computer-readable storage medium storing instructions for processing user interface commands in an instant messaging application, the instructions, when executed by one or more processors, cause the one or more processors to perform the method of claim 17.

* * * * *